US010785449B2

(12) United States Patent
Ankita et al.

(10) Patent No.: US 10,785,449 B2
(45) Date of Patent: Sep. 22, 2020

(54) COMMUNICATING USING MEDIA CONTENT (71) Applicant: Qualcomm Incorporated, San Diego, CA (US)

(72) Inventors: Ankita, Hyderabad (IN); Akash Kumar, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 15/875,797

(22) Filed: Jan. 19, 2018

(65) Prior Publication Data
US 2019/0182455 A1    Jun. 13, 2019

Related U.S. Application Data (60) Provisional application No. 62/596,696, filed on Dec. 8, 2017.

(51) Int. Cl.
*H04N 7/15* (2006.01)
*G06K 9/00* (2006.01)
*H04M 1/725* (2006.01)
*H04M 1/56* (2006.01)
*G06K 9/62* (2006.01)
(Continued)

(52) U.S. Cl.
CPC ......... *H04N 7/152* (2013.01); *G06K 9/00288* (2013.01); *G06K 9/6273* (2013.01); *H04M 1/27475* (2020.01); *H04M 1/56* (2013.01); *H04M 1/72583* (2013.01); *H04N 7/147* (2013.01); *H04M 2250/60* (2013.01); *H04M 2250/66* (2013.01); *H04N 2007/145* (2013.01)

(58) Field of Classification Search
CPC ........ H04N 7/15; H04N 7/147; H04N 5/2257; H04N 5/23293; H04N 1/32144; H04N 2201/3207; H04N 2201/3208; H04N 2201/3209; G06K 9/00221; G06K 9/78; G06K 2209/27
USPC .......................................... 348/14.01–14.16
See application file for complete search history.

(56) References Cited

U.S. PATENT DOCUMENTS

2010/0062753 A1* 3/2010 Wen ................... H04M 1/27455
                                                      455/418
2010/0162171 A1* 6/2010 Felt .................... H04M 1/27455
                                                      715/835
(Continued)

FOREIGN PATENT DOCUMENTS

EP    2369819 A1    9/2011
EP    2672682 A2    12/2013
(Continued)

OTHER PUBLICATIONS

International Search Report and Written Opinion—PCT/US2018/064106—ISA/EPO—dated Feb. 13, 2019.

*Primary Examiner* — Melur Ramakrishnaiah
(74) *Attorney, Agent, or Firm* — Qualcomm Incorporated (57) ABSTRACT Disclosed are methods and apparatuses for communicating using a media. In an aspect, an apparatus displays a media, receives a selection of a person displayed in the media, identifies the selected person, displays communication methods that may be used to communicate with the identified person, receives a selection of one of the communication methods, and engages in a communication with the identified person using the selected communication method.

28 Claims, 10 Drawing Sheets (51) Int. Cl.
*H04N 7/14* (2006.01)
*H04M 1/27475* (2020.01)

(56) References Cited

U.S. PATENT DOCUMENTS

| | | | |
|---|---|---|---|
| 2011/0026778 A1 | 2/2011 | Ye et al. | |
| 2011/0154208 A1* | 6/2011 | Horii | H04L 67/22 |
| | | | 715/736 |
| 2013/0202096 A1* | 8/2013 | Chen | H04M 1/27455 |
| | | | 379/90.01 |
| 2014/0215404 A1* | 7/2014 | Kong | G06F 3/04817 |
| | | | 715/838 |
| 2014/0351713 A1* | 11/2014 | Hallerstrom Sjostedt | |
| | | | G06F 3/0484 |
| | | | 715/752 |
| 2015/0033143 A1* | 1/2015 | Lee | H04L 51/16 |
| | | | 715/752 |
| 2015/0085146 A1* | 3/2015 | Khemkar | H04N 7/147 |
| | | | 348/207.1 |
| 2015/0135096 A1* | 5/2015 | Dhara | H04L 65/403 |
| | | | 715/753 |
| 2016/0165029 A1* | 6/2016 | Jegal | G06F 3/0482 |
| | | | 715/811 |
| 2016/0283864 A1 | 9/2016 | Towal et al. | |
| 2016/0321784 A1* | 11/2016 | Annapureddy | G06K 9/66 |
| 2017/0034325 A1* | 2/2017 | Wang | G06K 9/00288 |
| 2017/0185267 A1* | 6/2017 | Katai | G06F 3/04845 |

FOREIGN PATENT DOCUMENTS

| | | |
|---|---|---|
| EP | 2720126 A1 | 4/2014 |
| EP | 3125155 A1 | 2/2017 |

\* cited by examiner

COMMUNICATING USING MEDIA CONTENT

CROSS REFERENCES

The present Application for Patent claims priority to U.S. Provisional Patent Application No. 62/596,696 by Ankita, et al., titled "Communicating Using Media Content," filed Dec. 8, 2017, assigned to the assignee hereof, and is hereby incorporated by reference herein in its entirety.

FIELD

The present disclosure relates generally to mobile devices, and more particularly, to communicating using media contents.

BACKGROUND

Mobile devices have become integral part of the modern life. People use mobile devices to communicate and schedule their daily lives. Also, people use mobile devices to take photos and videos that are stored on the mobile devices. People often browse the photos and videos on the mobile devices to cherish the captured moments. While viewing the photos and videos, people often get desires to contact the people in the photos and videos and share the moments with others. Therefore, there is a need for easily contacting and communicating with the people in media contents such as photos and videos while browsing and viewing the media contents.

SUMMARY

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment or a mobile device including at least one processor and a memory coupled to the at least one processor. The processor displays a media, receive a selection of a person displayed in the media, identifies the selected person, displays communication methods that may be used to communicate with the identified person, receives a selection of one of the communication methods, and engages in a communication with the identified person using the selected communication method.

In an aspect, a method of communicating using a media includes displaying a media, receiving a selection of a person displayed in the media, identifying the selected person, displaying communication methods that may be used to communicate with the identified person, receiving a selection of one of the communication methods, and engaging in a communication with the identified person using the selected communication method.

In an aspect, an apparatus for communicating using a media includes means for displaying a media, means for receiving a selection of a person displayed in the media, means for identifying the selected person, means for displaying communication methods that may be used to communicate with the identified person, means for receiving a selection of one of the communication methods, and means for engaging in a communication with the identified person using the selected communication method.

In an aspect, a non-transitory computer-readable medium storing computer-executable instructions for automatically setting a reminder includes computer-readable instructions comprising at least one instruction to display a media, receive a selection of a person displayed in the media, identifies the selected person, display communication methods that may be used to communicate with the identified person, receive a selection of one of the communication methods, and engage in a communication with the identified person using the selected communication method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of mobile devices will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
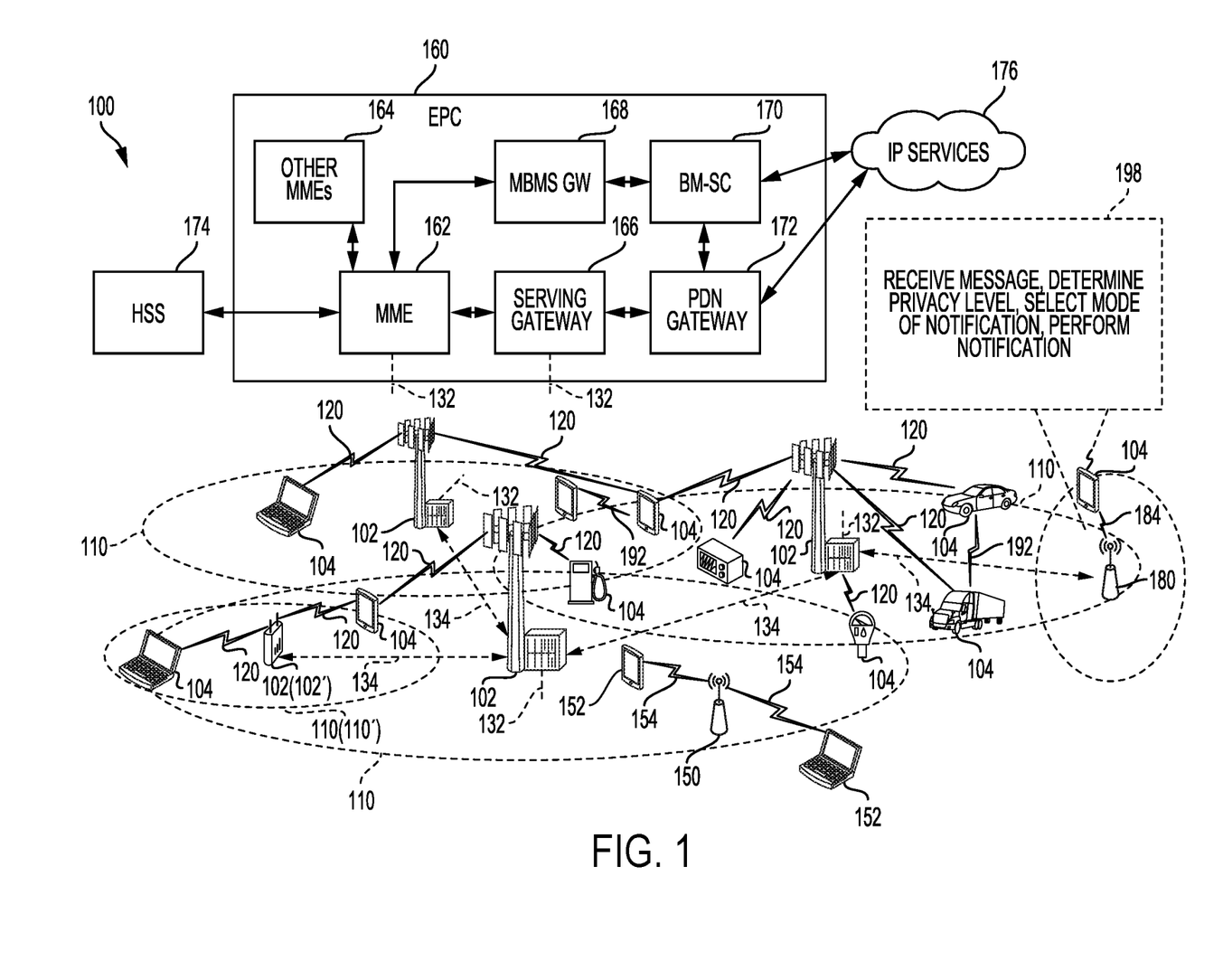
FIG. 1 is a diagram illustrating an example of a wireless communication system and an access network.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery.

The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may be configured to receive a message, determine a privacy level of the message, select a mode of notification of the message based on the determined privacy level of the message, and perform a notification action based on the selected mode of notification (198).

Figure 6:
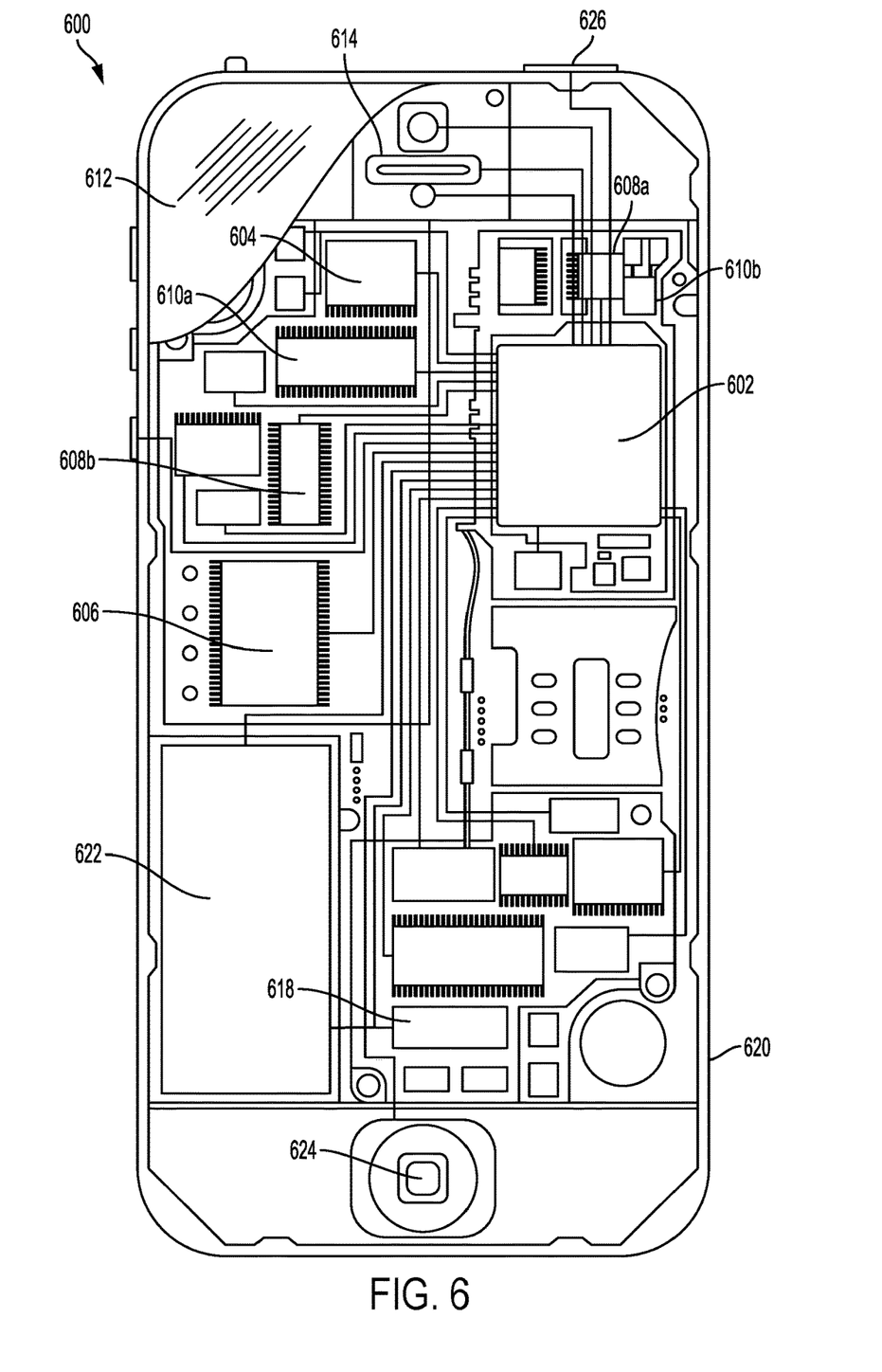
FIG. 6 illustrates an exemplary mobile device that may be suitably used in accordance with various aspects described herein.

According to various aspects, FIG. 6 illustrates an exemplary mobile device or UE 600 suitable for use in accordance with the various aspects and embodiments described herein. The mobile device 600 may be one of the UEs 104 shown in FIG. 1. For example, in various embodiments, the mobile device 600 may include a processor 602 coupled to a touchscreen controller 604 and an internal memory 606.

The processor 602 may be one or more multi-core integrated circuits designated for general or specific processing tasks. The processor 602 maybe a system-on-chip (SOC), which may include a general-purpose processor (CPU) or multi-core general-purpose processors (CPUs). The processor 602 may be a system-on-a-chip (SOC) 400 shown in FIG. 4, which may include a general-purpose processor (CPU) or multi-core general-purpose processors (CPUs) 402 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a dedicated memory block 418, or may be distributed across multiple blocks. Instructions executed at the general-purpose processor 402 may be loaded from a program memory associated with the CPU 402 or may be loaded from a dedicated memory block 418.

Figure 4:
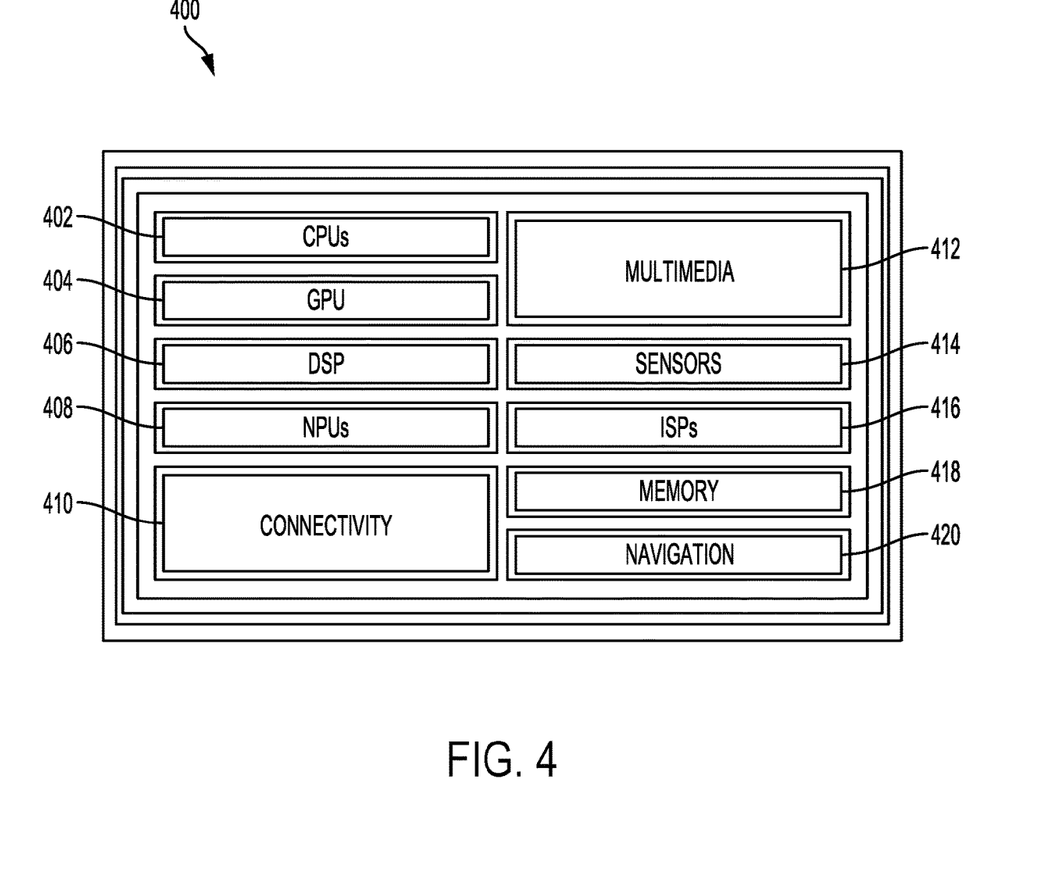
FIG. 4 illustrates an example implementation of designing a neural network using a system-on-chip (SOC), including a general purpose processor in accordance with an aspect.

The SOC 400 may also include additional processing blocks tailored to specific functions, such as a GPU 404, a DSP 406, a connectivity block 410, which may include fourth generation long term evolution (4G LTE) connectivity, unlicensed Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation 420, which may include a global positioning system.

The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, a display of the mobile device need not have touchscreen capabilities.

The mobile device 600 may have one or more cellular network transceivers 608a, 608b coupled to the processor 602 and configured to send and receive cellular communications over one or more wireless networks. The transceivers 608a and 608b may be used with the above-mentioned circuitry to implement the various aspects and embodiment described herein.

In various embodiments, the mobile device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not explicitly shown in FIG. 6).

In various embodiments, the mobile device 600 may also include one or more speakers 614 to provide audio outputs. The mobile device 600 may also include a housing 620, which may be constructed of a plastic, metal, or a combination of materials, to contain all or one or more of the components discussed herein. The mobile device 600 may include a power source 622 coupled to the processor 602, such as a disposable or rechargeable battery. The rechargeable battery 622 may also be coupled to the peripheral device connection port (not shown) to receive a charging current from a source external to the mobile device 600. The mobile device 600 may also include a physical button 624 configured to receive user inputs and a power button 626 configured to turn the mobile device 600 on and off.

Figure 2A:
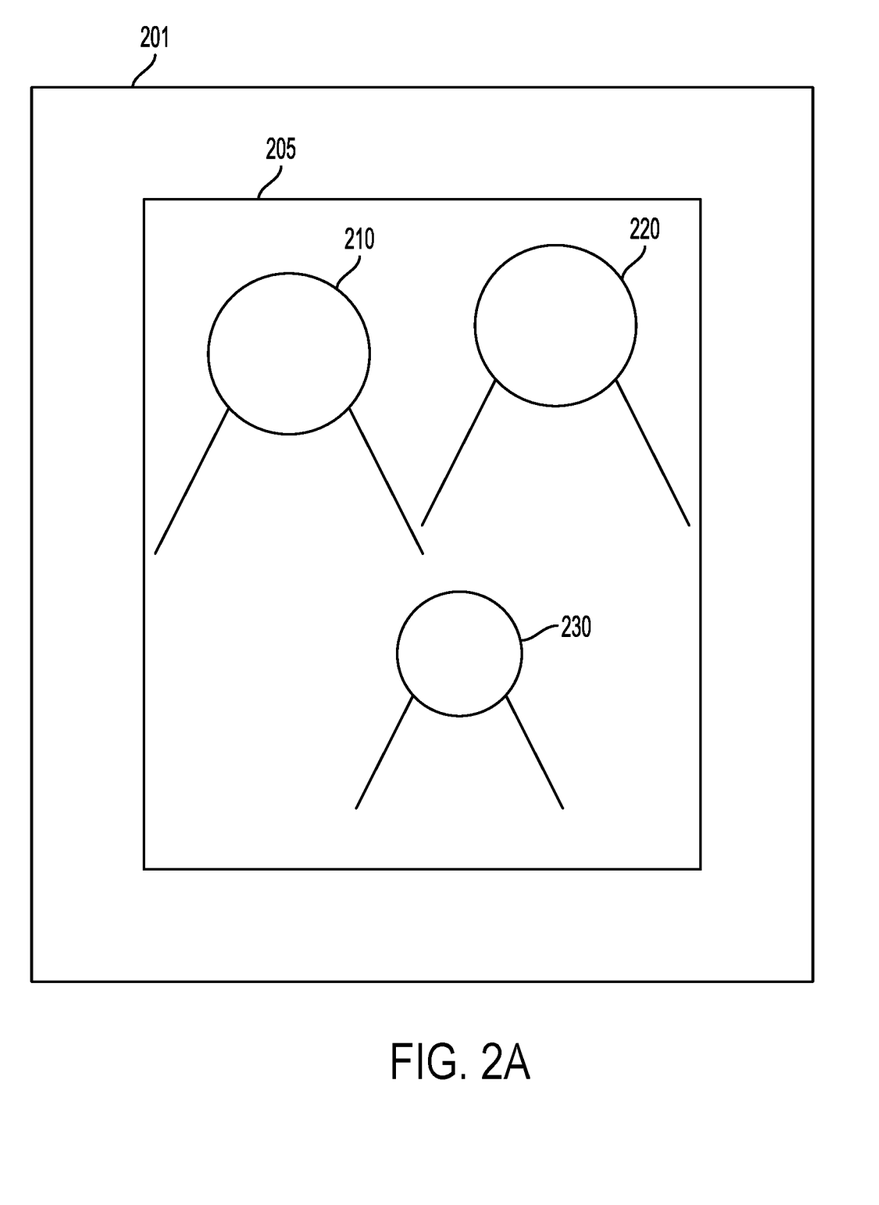
FIG. 2A illustrates a situation where a user is browsing or looking at a media content according to an aspect.

FIG. 2A illustrates a situation where a user is browsing or looking at a media content 205 on a mobile device 201. The mobile device 201 may be similar or same as the mobile device 600. The media content 205 maybe a photo, a video, a GIF file or any type of different formats where a picture or representation of people are shown. Often, when users of mobile devices are browsing media contents on their mobile devices such as photos or videos, especially taken with friends or families, the users often will get a desire to call or communicate with the family members or friends they see in the photos or videos.

In FIG. 2A, the media content 205 shows three pictures or representations 210, 220 and 230 of one or more people. In an aspect, the user of the mobile device 201 may communicate with any person represented by the pictures 210, 220 and 230 shown in the media content 205 by tapping and holding the picture of that particular person. For example, if the user wants to communicate with the person represented by picture 210, the user may tap and hold the picture 210.

Figure 2B:
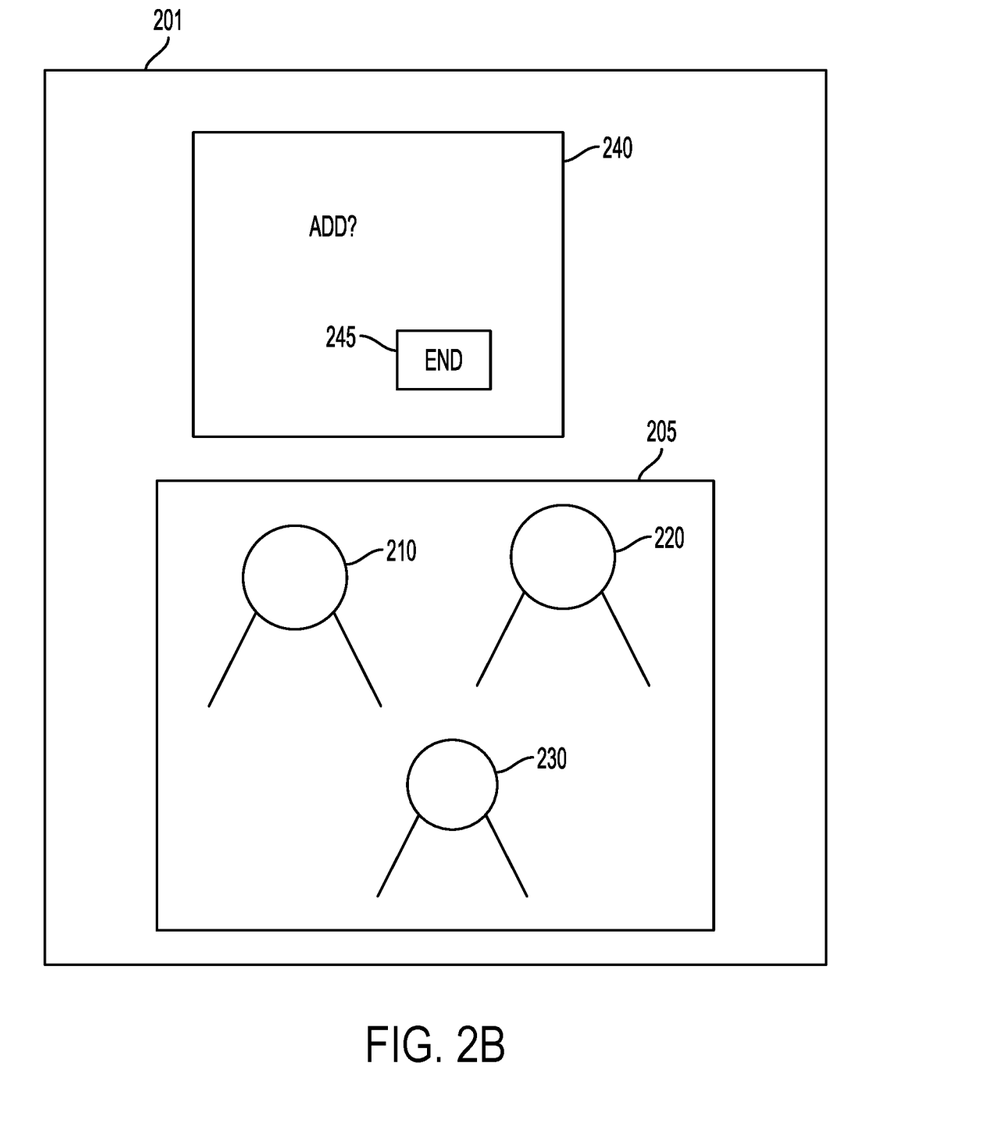
FIG. 2B illustrates an example of selecting person(s) to contact according to an aspect.

When the user taps and holds a picture of a person, the mobile device 201 offers an option to tap and add additional persons that the user may want to contact as illustrated in FIG. 2B. In aspect, a window such as a window 240 may pop up asking the user to add an additional person that the user may want to contact along with the first chosen person. In an aspect, the window 240 may pop up if there is more than one person displayed in the media. After tapping the photo of the additional person(s), the user may hit the "END" button 245 as shown in FIG. 2B.

After the user has finished choosing or selecting the persons that the user wants to contact, the mobile device 201 identifies the selected person(s). Referring to FIG. 6, the identification of the person(s) chosen by the user may be performed by the processor 602 that functions as a facial and image recognition engine that identifies the person(s) chosen by the user. Furthermore, the facial and image recognition may be performed by an artificial neural network that resides in the processor 602 or in another part of the mobile device 600. The artificial neural network may reside in the NPU 408 shown in FIG. 4. The artificial neural network may reside outside the mobile device 600 and maybe part of the access network 100. An artificial neural network is particularly suited for the facial and image recognition because a neural network may be trained to recognize a person in different situations, angles, lightings and contexts that a simple recognition engine may miss.

In an aspect, a neural network implemented by the processor 602 may be a deep convolutional network. A deep convolutional network is particularly well suited for image recognition especially facial recognition and identification for its robustness and ability to efficiently train its network to adapt to different facial features of a person. However, the processor 602 is not limited to a deep convolutional network but may implement other types of neural network such as a recurrent neural network or spiking neural network.

Figure 3:
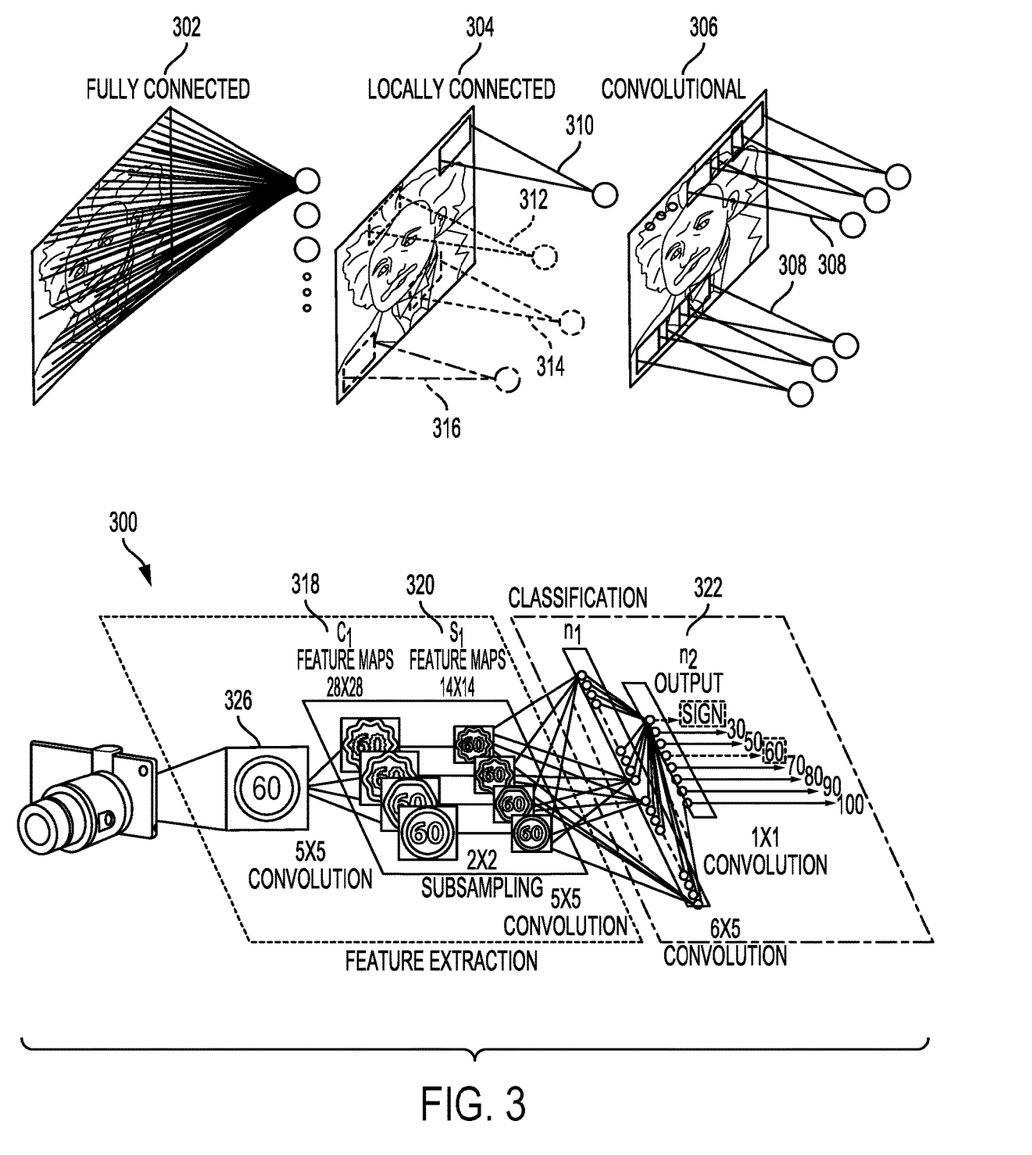
FIG. 3 is a diagram illustrating a neural network in accordance with aspects of the present disclosure.

FIG. 3 illustrates structures of a deep convolutional network according to an aspect.

Referring to FIG. 3, the connections between layers of a deep convolutional neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a deep convolutional network (DCN) 300 designed to recognize visual features from a camera may develop high layer neurons with different properties depending on their association with the lower versus the upper portion of the image. The DCN 300 may reside in the NPU 408. Neurons associated with the lower portion of the image may learn to recognize lane markings, for example, while neurons associated with the upper portion of the image may learn to recognize traffic lights, traffic signs, and the like. Similarly, the neurons associated with the lower portion of an image may be trained to recognize lower portion of a face of a person while neurons associated with the upper portion of the image may learn to recognize the upper portion of a face of a person.

The DCN 300 may be trained with supervised learning. For example, during training, the DCN 300 may be presented with an image, such as a cropped image of a speed limit sign 326, and a "forward pass" may then be computed to produce an output 322. The output 322 may be a vector of values corresponding to features such as "sign," "60," and "100." The network designer may want the DCN 300 to output a high score for some of the neurons in the output feature vector, for example the ones corresponding to "sign" and "60" as shown in the output 322 for the DCN 300 that has been trained. Before training, the output produced by the DCN 300 is likely to be incorrect, and so an error may be calculated between the actual output and the target output. The weights of the DCN 300 may then be adjusted so that the output scores of the DCN 300 are more closely aligned with the target. Similarly, the DCN 300 may be trained to recognize different features of a face such that, for example, the neurons that correspond to an "eye" or "nose" output a high score.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN 300 may be presented with new images 326 and a forward pass through the network may yield an output 322 that may be considered an inference or a prediction of the DCN 300.

As such, the DCN 300 may train itself every time a picture is taken with a camera on the mobile device 600 in accordance with an aspect. Whenever a picture is taken, the DCN 300 trains itself to recognize any person in the picture. Furthermore, the DCN 300 may train itself on the media already stored on the mobile device 600 such as photos and videos.

Figure 2C:
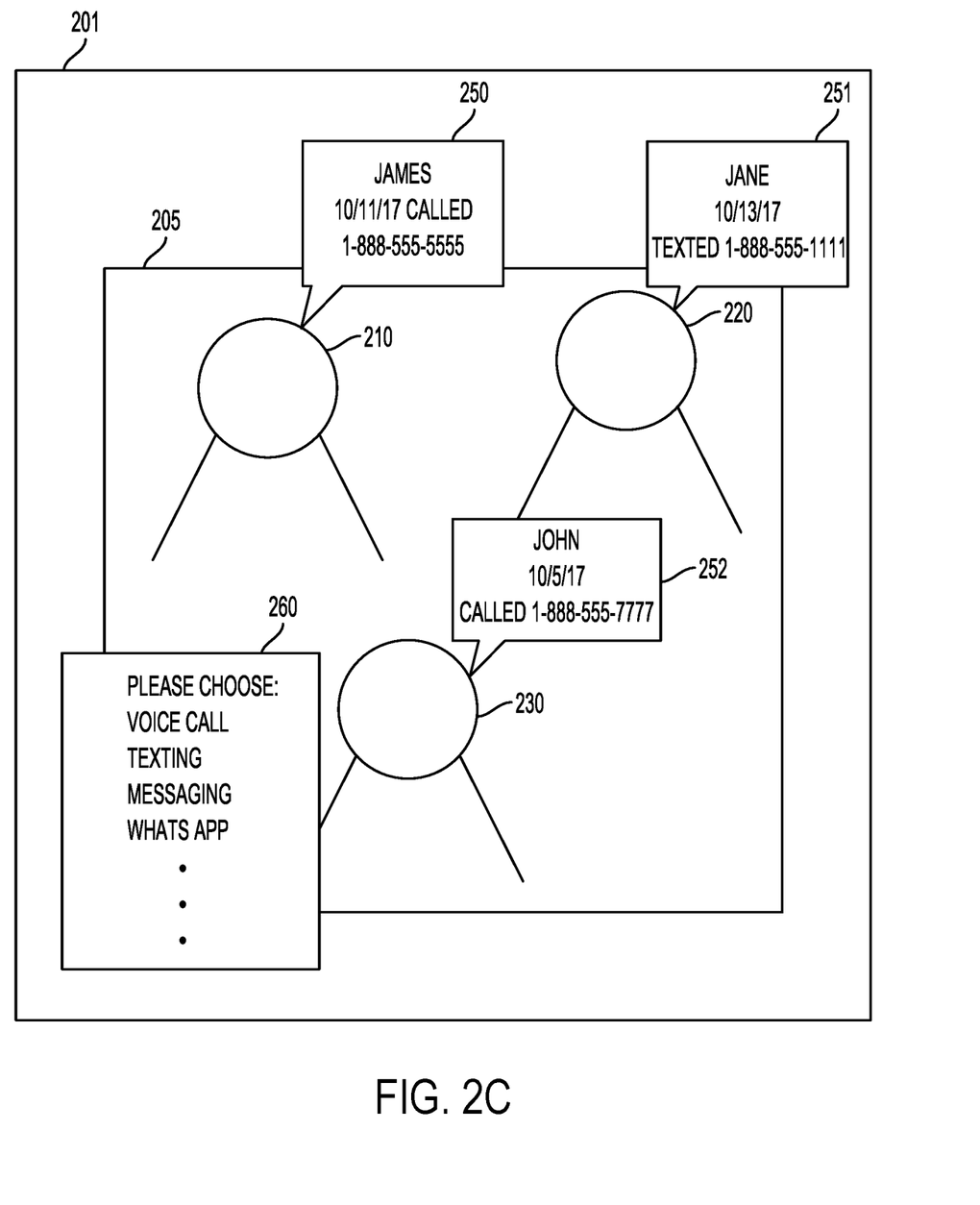
FIG. 2C illustrates an example of identifying selected person(s) according to an aspect.

Referring to FIG. 2C, as soon as the user of the mobile device 201 finishes selecting the person(s) that the user wants to communicate with, the mobile device 201 utilizes the DCN 300 to recognize and identify the persons 210, 220 and 230. For example, in FIG. 2C, the persons 210, 220 and 230 have been identified as James, Jane and John, respectively. However, the example shown in FIG. 2C is just exemplary, and in an aspect, more or less than the person(s) shown in FIG. 2C maybe recognized and identified. As shown in FIG. 2C, in addition to the identification of the persons chosen by the user of the mobile device 201, the mobile device 201 lists the previous methods and dates of communication with each of the identified persons. The windows 250, 251 and 252 shows the identity, the dates and the methods of communication that were used to contact each of the identified persons. For example, the window 250 shows that James was called on 10/11/17 using a phone number 888-555-5555. In an aspect, the feature showing the date and the communication method may be turned off by the user. The feature showing the date and the communication method helps the user of the mobile device 201 to determine the method that the user will use to communicate with the identified persons 210, 220 and 230.

Furthermore, in an aspect, a window 260 shows the different methods that the user of the mobile device 201 may use to communicate with the identified persons 210, 220 and 230. As an example, the window 260 lists voice call, texting, messaging and WhatsApp as the available methods for communicating with the identified person. In an aspect, the mobile device may list and use other methods to communicate with the identified persons including such apps as Skype, Facebook, Twitter, etc. In an aspect, the user of the mobile device 201 may set the apps and the methods to be used to communicate with identified persons in the setting. If the user chooses or selects one of the communication methods listed in the window 260 by tapping on that method, the mobile device 201 uses that method to communicate with the identified persons. For example, if the user chooses the voice call method, the mobile device 201 will conduct a conference call if there are more than one identified person or a regular voice call if there is only one identified person. In another example, if a chatting app was chosen as the communication method, the chatting app would conduct a group chat if more than one person was chosen by the user.

Figure 2D:
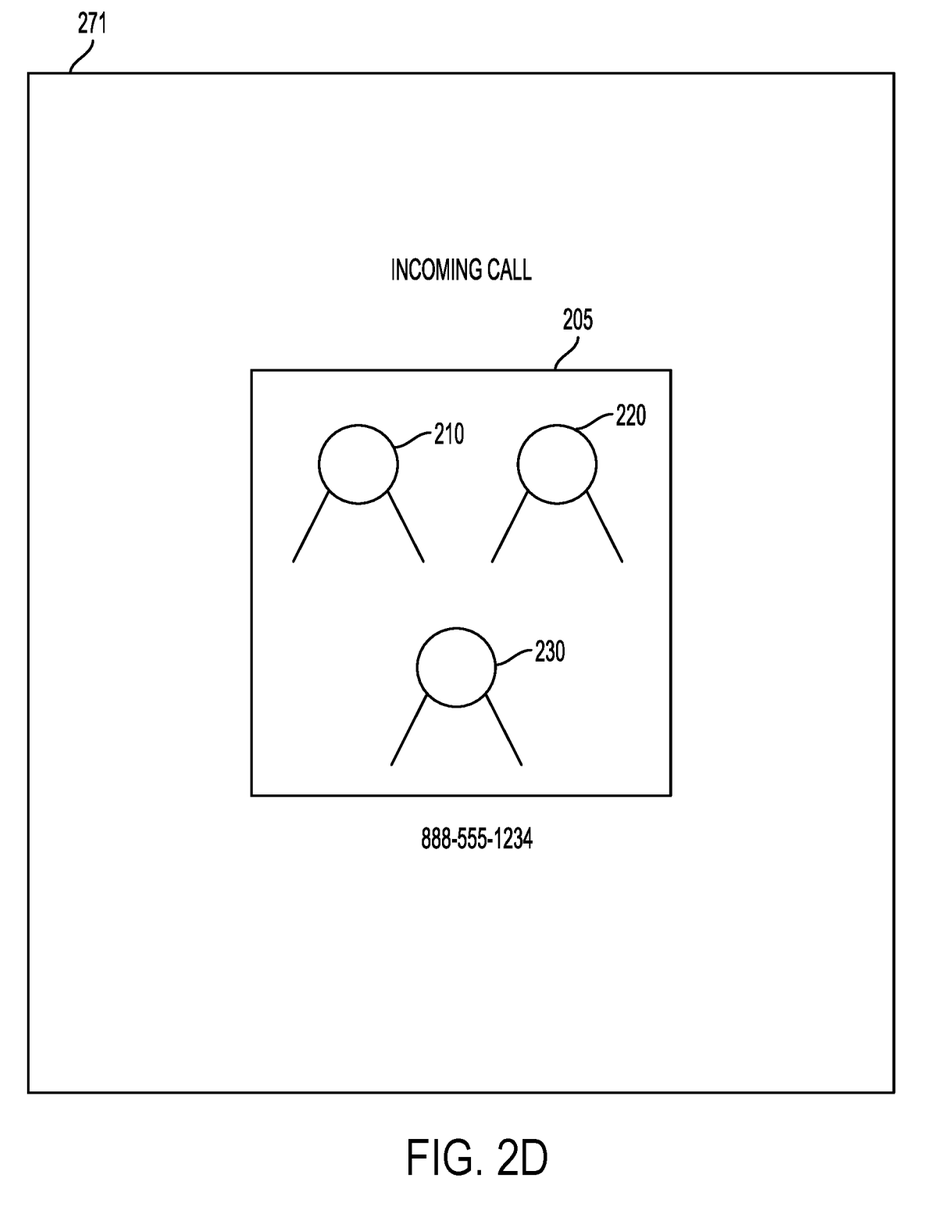
FIG. 2D illustrates an example where the media used to select person(s) is sent to a mobile device receiving a communication.

As shown in FIG. 2D, in an aspect, a mobile device 271 receives a call from the mobile device 201 where the user of the mobile device 201 used a media such as the photo 205 to initiate a communication as discussed above. The receiving mobile device 271 may display the photo 205 when the mobile device 271 receives a communication such as a voice call from the mobile device 201. The mobile device 201 may send the photo 205 to the mobile device 271 when the user of the mobile device 201 gives an appropriate permission.

Figure 5:
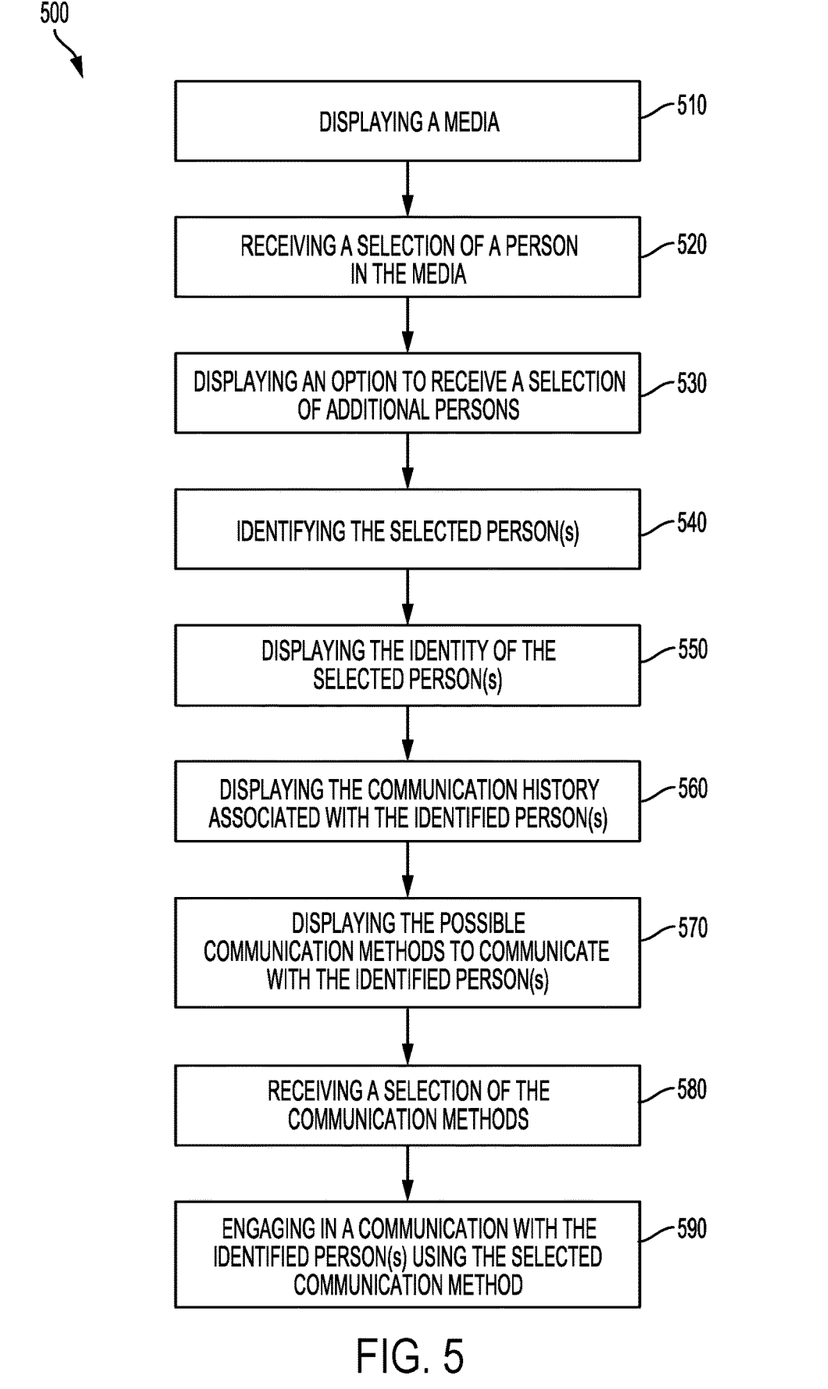
FIG. 5 illustrates a flowchart of a method of communicating using a media in accordance with an aspect.

FIG. 5 is a flowchart 500 of a method of communicating using a media content such as a photo or a video. The method may be performed by a processor such as the processor 602. In one configuration, the flowchart 500 described in FIG. 5 may be performed by the mobile device 600 described above with reference to FIG. 6.

In an aspect, at 510, the mobile device 600 displays a media such as a photo or a video. At 520, the mobile device 600 receives a selection of a person in the media. The user of the media may select a person by tapping on the person shown in the media. However, the user may use other methods to select a person and is not limited to tapping on a person. At 530, the mobile device 600 displays an option to receive a selection of additional person(s) from the user by displaying a window such as the window 240 shown in FIG. 2B. When the window 240 is displayed, the user of the mobile device 600 may select additional person(s) by tapping on additional person(s) shown in the media displayed by the mobile device 600. The user may end the selection process by tapping on the window 245 shown in FIG. 2B. At 530, the mobile device 600 receives a selection of additional person(s) that the user wants to communicate with by using the displayed media.

In an aspect, at 540, the mobile device 600 identifies the person(s) selected by the user. The processor 602 functions as a facial recognition and identification engine that identifies the person(s) selected by the user of the mobile device 600. The facial recognition and identification may be performed by an artificial neural network that resides in the processor 602 or in another part of the mobile device 600. The artificial neural network may reside in the NPU 408 shown in FIG. 4. The artificial neural network may reside outside the mobile device 600 and maybe part of the access network 100. However, the processor 602 may employ other types of engines and techniques to perform facial recognition and is not limited to artificial neural networks.

At 550, the mobile device 600 displays the identities of the selected person(s) based on the facial recognition results. In an aspect, the identities may be displayed in a window next to each of the selected persons. Furthermore, at 560, the mobile device 600 displays the communication history associated with each of the identified persons. In an aspect, the communication history may include the times and the methods of communication such as voice call, chat, texting, etc. In other words, the communication history includes any type of communication that were attempted or established between the mobile device 600 and the identified person. In an aspect, the communication history may be displayed in the same window that displays the identity of the identified person.

At 570, the mobile device 600 displays possible communication methods that the user of the mobile device 600 may use to communicated with the selected and identified person(s). In an aspect, the communication methods may include a voice call (a conference call more multiple people), various types of chatting apps, a video call, various types of texting apps, and etc. The mobile device 600 displays all of the available communication methods that the user may use to communicate with the selected and identified person(s).

At 580, the user chooses one of the displayed communication methods, and the mobile device 600 receives the selected method of communication. In an aspect, the user may choose the communication method by tapping on the chosen method. The displayed communication history may aid the user to choose one of the communication methods.

At 590, the mobile device 600 engages in a communication with the selected and identified person(s) using the selected communication method such as voice call, texting, chat, etc.

Figure 7:
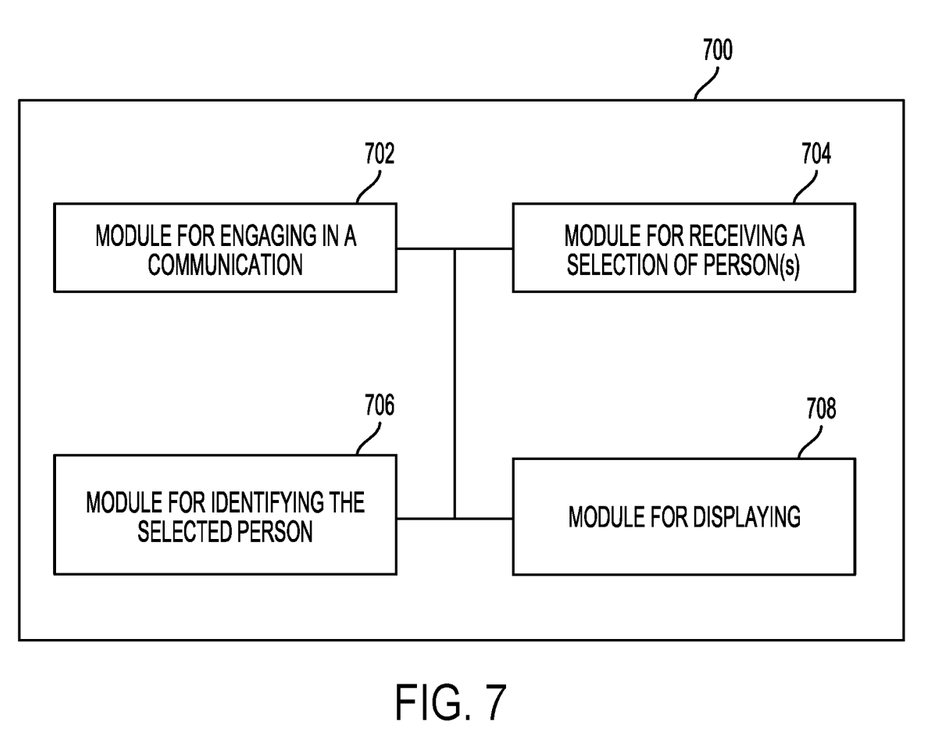
FIG. 7 is a simplified block diagram of various aspects of an apparatus configured to support the functionalities disclosed herein.

FIG. 7 illustrates an example mobile device apparatus 700 (which may correspond to the mobile device 600) represented as a series of interrelated functional modules. A module for engaging in a communication 702 may correspond at least in some aspects to, for example, a processing system, such as processor 602, in conjunction with a storage device, such as memory 606, as discussed herein. Furthermore, the module for engaging in a communication 702 may communicate through the access network 100. The module for engaging in a communication 702 may allow the user of the mobile device 700 to communicate with the selected and identified person(s) based on a communication method chosen by the user. A module for receiving a selection of person(s) may correspond at least in some aspects to, for example, a processing system, such as processor 602, in conjunction with a storage device, such as memory 606, the touchscreen controller 604 and the touchscreen panel 612 as discussed herein. A module for identifying the selected person 706 may correspond at least in some aspects to, for example, a processing system, such as processor 602, in conjunction with a storage device, such as memory 606, as discussed herein. A module for displaying 708 may correspond at least in some aspects to, for example, a processing system, such as processor 602, in conjunction with a storage device, such as memory 606, the touchscreen controller 604 and the touchscreen panel 612 as discussed herein. The module for displaying may display the media used to select person(s) to engage in a communication, identities of the selected person(s), a list of communication methods and past communication histories.

The functionality of the modules 702-708 of FIG. 7 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for automatically setting a reminder of the mobile device 600.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communicating using a media, comprising:
   displaying the media;
   receiving a selection of a person displayed in the media;
   identifying the selected person;
   displaying communication methods that may be used to communicate with the identified person;
   displaying a communication history associated with the identified person, wherein the communication history associated with the identified person is displayed in a window visually associated with a location in the media of the selected person and the media is a photo or a video;

receiving a selection of one of the communication methods; and engaging in a communication with the identified person using the selected communication method.

2. The method of claim 1, further comprising:
displaying the identity of the selected person.

3. The method of claim 2, wherein the identity of the selected person is displayed in the window associated with the location in the media of the selected person.

4. The method of claim 3, further comprising:
displaying an option to choose an additional person.

5. The method of claim 4, further comprising:
identifying the additional person, wherein the additional person is added in the communication.

6. The method of claim 1, wherein the identifying the selected person is performed by an artificial neural network.

7. The method of claim 6, wherein the artificial neural network is a deep convolutional network.

8. The method of claim 1, wherein the communication methods comprise a voice call, texting, chat or a combination thereof.

9. The method of claim 1, wherein a device receiving the communication receives the media and displays the media.

10. A mobile apparatus for communicating using a media, comprising:
means for displaying the media;
means for receiving a selection of a person displayed in the media;
means for identifying the selected person;
means for displaying communication methods that may be used to communicate with the identified person;
means for displaying a communication history associated with the identified person, wherein the communication history associated with the identified person is displayed in a window visually associated with a location in the media of the selected person and the media is a photo or a video;
means for receiving a selection of one of the communication methods; and
means for engaging in a communication with the identified person using the selected communication method.

11. The apparatus of claim 10, further comprising:
means for displaying the identity of the selected person.

12. The apparatus of claim 11, wherein the means for displaying the identity of the selected person is combined in the window associated with the location in the media of the selected person.

13. The apparatus of claim 12, further comprising:
means for displaying an option to choose an additional person.

14. The apparatus of claim 13, further comprising:
means for identifying the additional person, wherein the additional person is added in the communication.

15. The apparatus of claim 10, wherein the means for identifying the selected person includes an artificial neural network.

16. The apparatus of claim 15, wherein the artificial neural network is a deep convolutional network.

17. The apparatus of claim 10, wherein the communication methods comprise a voice call, texting, chat or a combination thereof.

18. The apparatus of claim 10, wherein a device receiving the communication receives the media and displays the media.

19. An apparatus for communicating using a media, comprising:
a memory: and
at least one processor coupled to the memory and configured to:
display the media;
receive a selection of a person displayed in the media;
identify the selected person;
display communication methods that may be used to communicate with the identified person;
display a communication history associated with the identified person, wherein the communication history associated with the identified person is displayed in a window visually associated with a location in the media of the selected person and the media is a photo or a video;
receive a selection of one of the communication methods; and
engage in a communication with the identified person using the selected communication method.

20. The apparatus of claim 19, wherein the at least one processor is further configured to:
display the identity of the selected person.

21. The apparatus of claim 20, wherein the at least one processor is further configured to:
display the identity of the selected person in the window associated with the location in the media of the selected person.

22. The apparatus of claim 21, wherein the at least one processor is further configured to:
display an option to choose an additional person.

23. The apparatus of claim 22, wherein the at least one processor is further configured to:
identify the additional person, wherein the additional person is added in the communication.

24. The apparatus of claim 19, wherein the at least one processor includes an artificial neural network to identify the selected person.

25. The apparatus of claim 24, wherein the artificial neural network is a deep convolutional network.

26. The apparatus of claim 19, wherein the communication methods comprise a voice call, texting, chat or a combination thereof.

27. The apparatus of claim 19, wherein a device receiving the communication receives the media and displays the media.

28. A non-transitory, tangible computer-readable medium storing computer executable code for automatically setting a reminder, comprising code to:
display a media;
receive a selection of a person displayed in the media;
identify the selected person;
display communication methods that may be used to communicate with the identified person;
display a communication history associated with the identified person, wherein the communication history associated with the identified person is displayed in a window visually associated with a location in the media of the selected person and the media is a photo or a video;
receive a selection of one of the communication methods; and
engage in a communication with the identified person using the selected communication method.

* * * * *